(12) United States Patent
Krausz et al.

(10) Patent No.: US 7,243,955 B2
(45) Date of Patent: Jul. 17, 2007

(54) UNIVERSAL PIPE CONNECTORS AND SEALING ELEMENT THEREFOR

(75) Inventors: Eliezer Krausz, Tel-Aviv (IL); Avi Chiproot, Kfar-Sava (IL)

(73) Assignee: Krausz Metal Industries Ltd., Tel Aviv (IL)

( * ) Notice: Subject to any disclaimer, the term of this patent is extended or adjusted under 35 U.S.C. 154(b) by 0 days.

(21) Appl. No.: 10/302,836

(22) Filed: Nov. 25, 2002

(65) Prior Publication Data

US 2003/0127858 A1 Jul. 10, 2003

Related U.S. Application Data

(62) Division of application No. 09/069,548, filed on Apr. 30, 1998, now abandoned.

(51) Int. Cl.
*F16L 21/00* (2006.01)

(52) U.S. Cl. .................. 285/236; 285/111; 285/223

(58) Field of Classification Search .................. 285/95, 285/104, 108, 111, 148.6, 236, 337, 345, 285/379, 224, 223, 367, 420
See application file for complete search history.

(56) References Cited

U.S. PATENT DOCUMENTS

| 703,657 | A | | 7/1902 | Horn | |
|---|---|---|---|---|---|
| 1,830,782 | A | * | 11/1931 | Burnish et al. | ............. 285/420 |
| 2,206,262 | A | | 7/1940 | Olt | |
| 2,937,037 | A | * | 5/1960 | Woolsey | ..................... 285/233 |
| 2,985,291 | A | | 5/1961 | Schoepe et al. | |
| 3,033,581 | A | | 5/1962 | Sims | |
| 3,059,941 | A | | 10/1962 | Kaynor et al. | |
| 3,124,367 | A | | 3/1964 | Kaynor | |
| 3,129,021 | A | * | 4/1964 | Willis et al. | ................ 285/367 |
| 3,150,876 | A | | 9/1964 | Lafferty | |
| 3,250,538 | A | | 5/1966 | Albon | |
| 3,386,745 | A | | 6/1968 | Hein | |
| 3,727,951 | A | | 4/1973 | Shire et al. | |
| 3,877,733 | A | | 4/1975 | Straub | |
| 4,362,323 | A | | 12/1982 | Lodder et al. | |
| 4,480,860 | A | | 11/1984 | Foresta et al. | |

(Continued)

FOREIGN PATENT DOCUMENTS

CA 628321 * 10/1961 ................. 285/111

(Continued)

*Primary Examiner*—Aaron Dunwoody
(74) *Attorney, Agent, or Firm*—Pearl Cohen Zedek Latzer, LLP

(57) ABSTRACT

A universal pipe connector for forming a connection with at least one pipe end includes a connector body having an opening for receiving the pipe end. A clamping ring, extending around, and mechanically engaging, the opening, features a tightening mechanism for tightening it between a first maximum diameter and a second minimum diameter which differ by at least a length d. An annular sealing element is deployed around an inner surface of the clamping ring for sealing around the pipe end. The sealing element is formed with a primary inner surface and at least one roughly cylindrical coaxial layer of thickness ½ d. The layer is connected to the primary inner surface by a readily severable connection such that, by selectively removing the layer and tightening the tightening mechanism, the pipe connector forms a sealing connection with pipes having diameters varying over a continuous range of at least 2 d.

2 Claims, 4 Drawing Sheets

U.S. PATENT DOCUMENTS

| | | | |
|---|---|---|---|
| 4,548,429 A | * 10/1985 | Merz | 285/420 |
| 4,810,832 A | 3/1989 | Spinner et al. | |
| 4,813,720 A | * 3/1989 | Cassel | 285/419 |
| 5,036,636 A | 8/1991 | Hasty | |
| 5,203,594 A | 4/1993 | Straub | |
| 5,310,158 A | * 5/1994 | Cassel | 248/74.3 |
| 5,560,656 A | * 10/1996 | Okamura et al. | 285/379 |
| 5,588,267 A | 12/1996 | Rodriguez et al. | |
| 5,941,576 A | 8/1999 | Krausz | |
| 6,089,618 A | 7/2000 | Neumann et al. | |
| 6,293,556 B1 | 9/2001 | Krausz | |

FOREIGN PATENT DOCUMENTS

| | | | |
|---|---|---|---|
| DE | 1271473 | * 6/1968 | 285/111 |
| DE | 2158816 | * 7/1972 | 285/111 |
| WO | WO 9641983 | 12/1996 | |

* cited by examiner

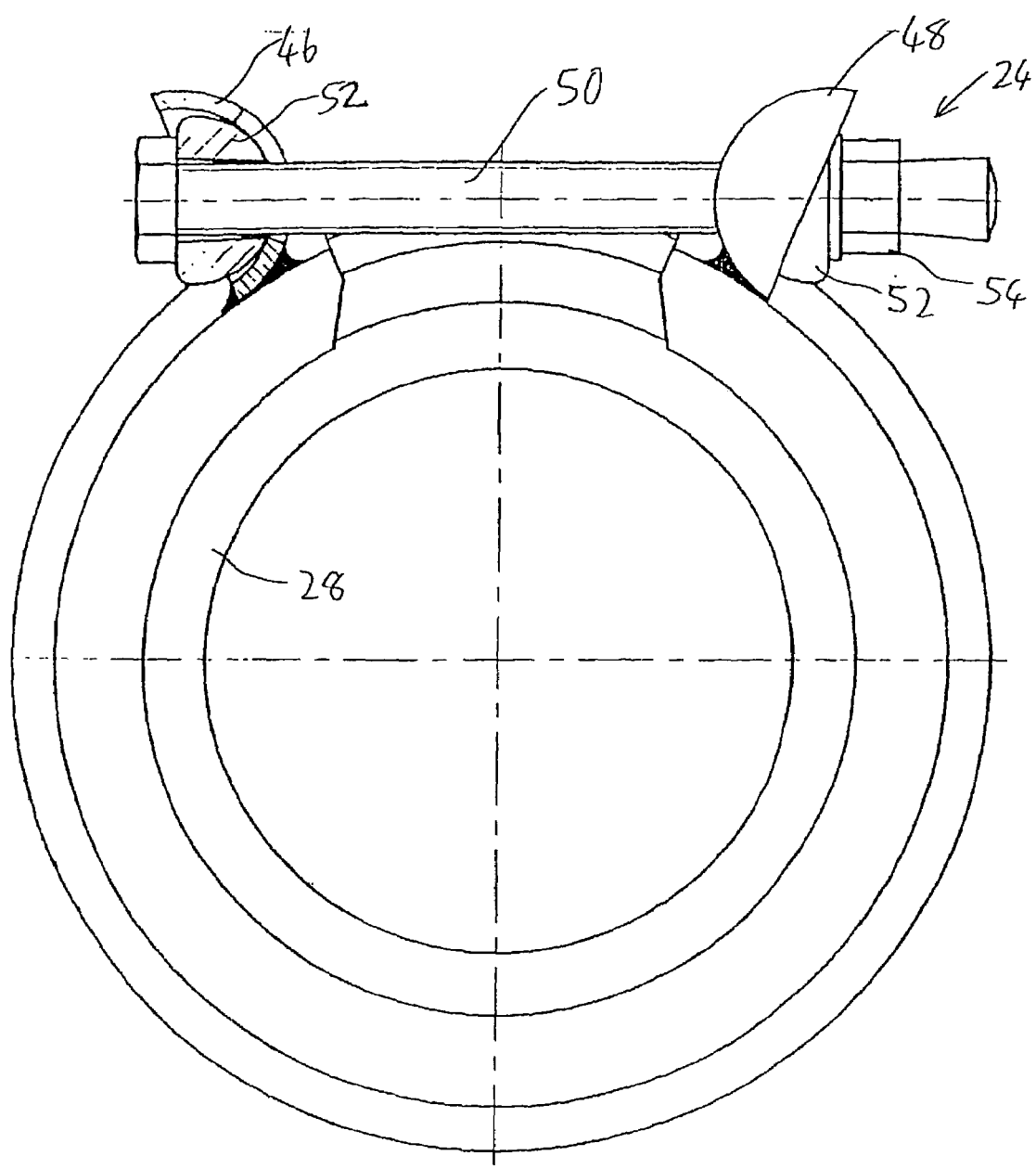

UNIVERSAL PIPE CONNECTORS AND SEALING ELEMENT THEREFOR

CROSS-REFERENCE TO RELATED APPLICATIONS

This application is a Divisional Application of U.S. patent application Ser. No. 09/069,548, filed Apr. 30, 1998 now abandoned, which is hereby incorporated by reference.

FIELD AND BACKGROUND THE INVENTION

The present invention relates to pipe connectors and, in particular, it concerns pipe connectors capable of forming seals with pipes of different diameters.

A wide range of connectors and adapters are known for use with pipes in many different contexts. Typically, each connector is suited to a specific diameter of pipe. Where a transition is required between different pipe diameters, again a purpose-designed adapter is typically used. As a result, the total stock of connectors and adapters which must be stocked by those responsible for servicing a large system of piping is very large, and the correct item may often not be readily available.

A further shortcoming of conventional connectors is that they provide rigid connections, either in a straight line or at a fixed angle. The resulting rigidity of the piping system may lead to fracturing and leakage due to subsidence or earthquakes.

U.S. Pat. No. 3,727,951 to Shire et al. discloses a connector which allows a degree of rotational freedom between two pipe ends. However, the round cross-section O-ring seals provide an inferior degree of sealing, and the radial split ends of the split clamp rings cause unnecessarily high localized stress. In addition, the connector is limited to a very specific diameter of pipe.

There is therefore a need for pipe connectors which can accommodate an increased range of pipe diameters. It would also be highly advantageous to provide a pipe connector which achieves a high degree of sealing while permitting considerable angular flexibility.

SUMMARY OF THE INVENTION

The present invention is a universal pipe connector and a corresponding sealing element.

According to the teachings of the present invention there is provided, a universal sealing element for a pipe connector comprising an annular ring of elastic material, the annular ring including: (a) a primary outer sealing ring having a substantially cylindrical primary inner surface having an inner diameter and a virtual central axis; and (b) a substantially cylindrical lining layer coaxially associated with the cylindrical primary inner surface, the lining layer providing a substantially cylindrical secondary inner surface having an inner diameter less than that of the primary inner surface, wherein the lining layer is connected to the primary outer sealing ring by a connection configured to be readily severable.

According to a further feature of the present invention, the primary outer sealing ring features a convex outer surface as viewed in axial cross-section.

According to a further feature of the present invention, the substantially cylindrical primary inner surface and an adjacent face of the lining layer have complementary interlocking features configured to oppose movement of the lining layer relative to the primary outer sealing ring in at least one axial direction.

According to a further feature of the present invention, the primary outer sealing ring has an inner annular hollow in fluid communication with at least one lateral aperture for generating hydraulic enhancement of a sealing action.

There is also provided according to the teachings of the present invention, a universal pipe connector for forming a connection with at least one pipe end, the universal pipe connector comprising: (a) a connector body having an opening for receiving the pipe end; (b) a clamping ring extending around, and in mechanical engagement with, the opening, the clamping ring featuring a tightening mechanism for tightening the clamping ring between a first maximum diameter and a second minimum diameter, the first and second diameters differing by at least a length d; and (c) an annular sealing element deployed around an inner surface of the clamping ring for sealing around the pipe end, the sealing element being formed with a primary inner surface and at least one substantially cylindrical coaxial layer of thickness ½ d, the layer being connected to the primary inner surface by a readily severable connection, such that, by selectively removing the layer and tightening the tightening mechanism, the pipe connector forms a sealing connection with pipes having diameters varying over a continuous range of at least 2 d.

According to a further feature of the present invention, the clamping ring is formed as a split ring with outward-turned bolt flanges of substantially arcuate form, the tightening mechanism including a bolt connected between the bolt flanges.

According to a further feature of the present invention, the tightening mechanism further includes at least one curved-base profile piece engaged against one of the bolt flanges.

According to a further feature of the present invention, the annular sealing element further features a convex outer surface as viewed in axial cross-section.

According to a further feature of the present invention, the plurality of substantially cylindrical coaxial layers have complementary interlocking features configured to oppose relative movement of the layers in at least one axial direction.

According to a further feature of the present invention, the annular sealing element further features an inner annular hollow in fluid communication with at least one lateral aperture for generating hydraulic enhancement of a sealing action.

There is also provided according to the teachings of the present invention, a method for achieving a sealed connection with an end of a pipe of given diameter, the method comprising: (a) providing a tightenable pipe connector assembly including an annular sealing element having a primary inner surface and at least one substantially cylindrical coaxial layer connected by a readily severable connection, an innermost of the at least one layer having an inner diameter less than the given diameter of pipe; (b) severing from the annular sealing element a number of the at least one layer such that an internal diameter of the remaining portion of the annular sealing element slightly exceeds the given diameter of pipe; (c) inserting the end of the pipe into the connector assembly; and (d) tightening the connector assembly around the end of the pipe so as to achieve a sealed connection.

Finally, there is also provided according to the teachings of the present invention, a universal connector for forming a connection with at least one conduit end, the universal connector comprising: (a) a connector body having an opening for receiving the conduit end; (b) a clamping element extending around, and in mechanical engagement with, the opening, the clamping element featuring a tightening mechanism for tightening the clamping element between a first fully open state and a second fully closed state; and (c) a sealing element deployed around an inner surface of the clamping element for sealing around the conduit end, the sealing element being formed with a primary inner surface and at least one lining layer connected to the primary inner surface by a readily severable connection.

BRIEF DESCRIPTION OF THE DRAWINGS

The invention is herein described, by way of example only, with reference to the accompanying drawings, wherein:

FIG. 4 is a transverse cross-section through the connector of FIG. 3.

DESCRIPTION OF THE PREFERRED EMBODIMENTS

The present invention is universal pipe connector and a corresponding sealing element.

The principles and operation of sealing connectors according to the present invention may be better understood with reference to the drawings and the accompanying description.

Figure 1:
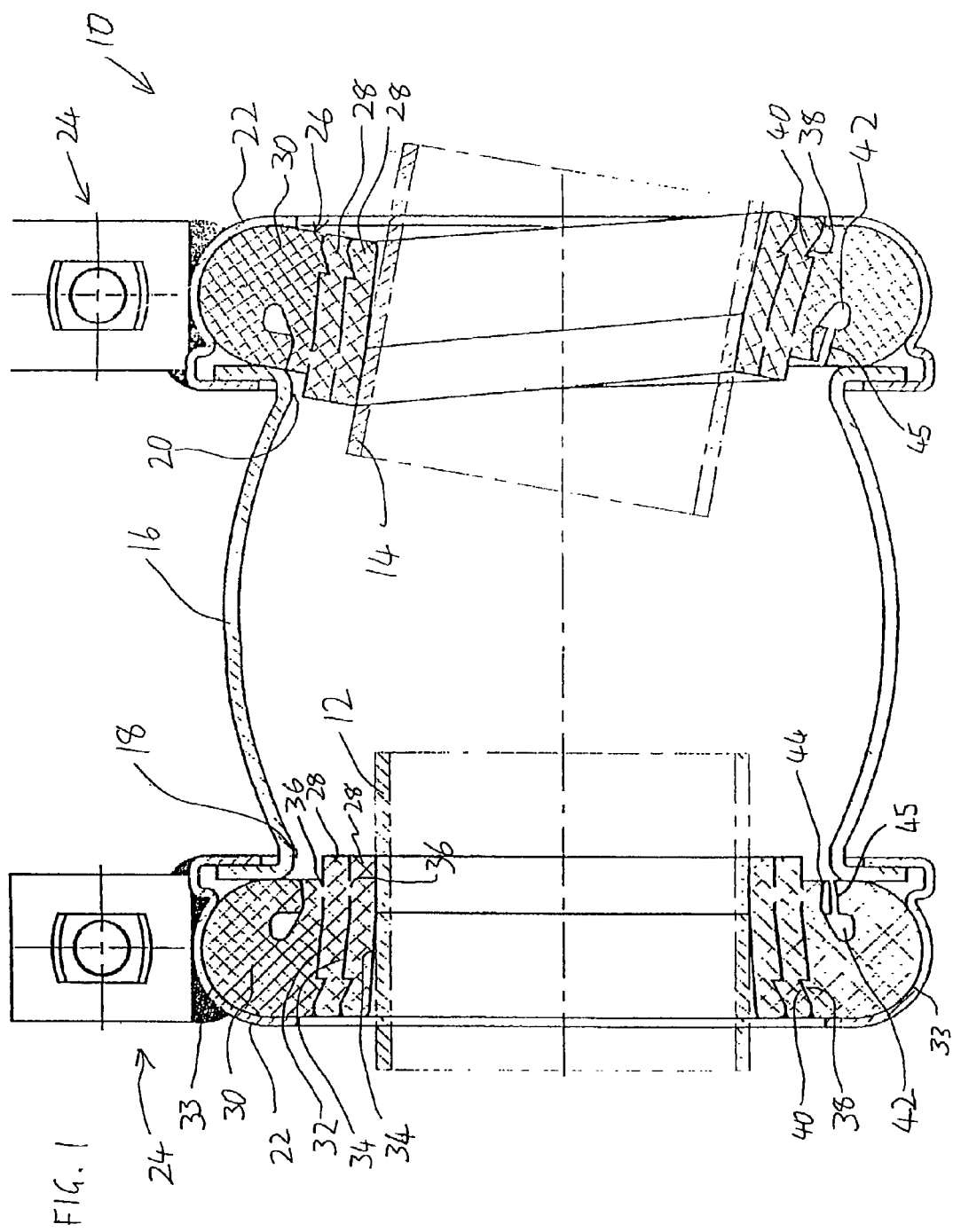
FIG. 1 is an axial cross-section through a first embodiment of a connector, constructed and operative teachings of the present invention, employed to connect the ends of two pipes.
Figure 2:
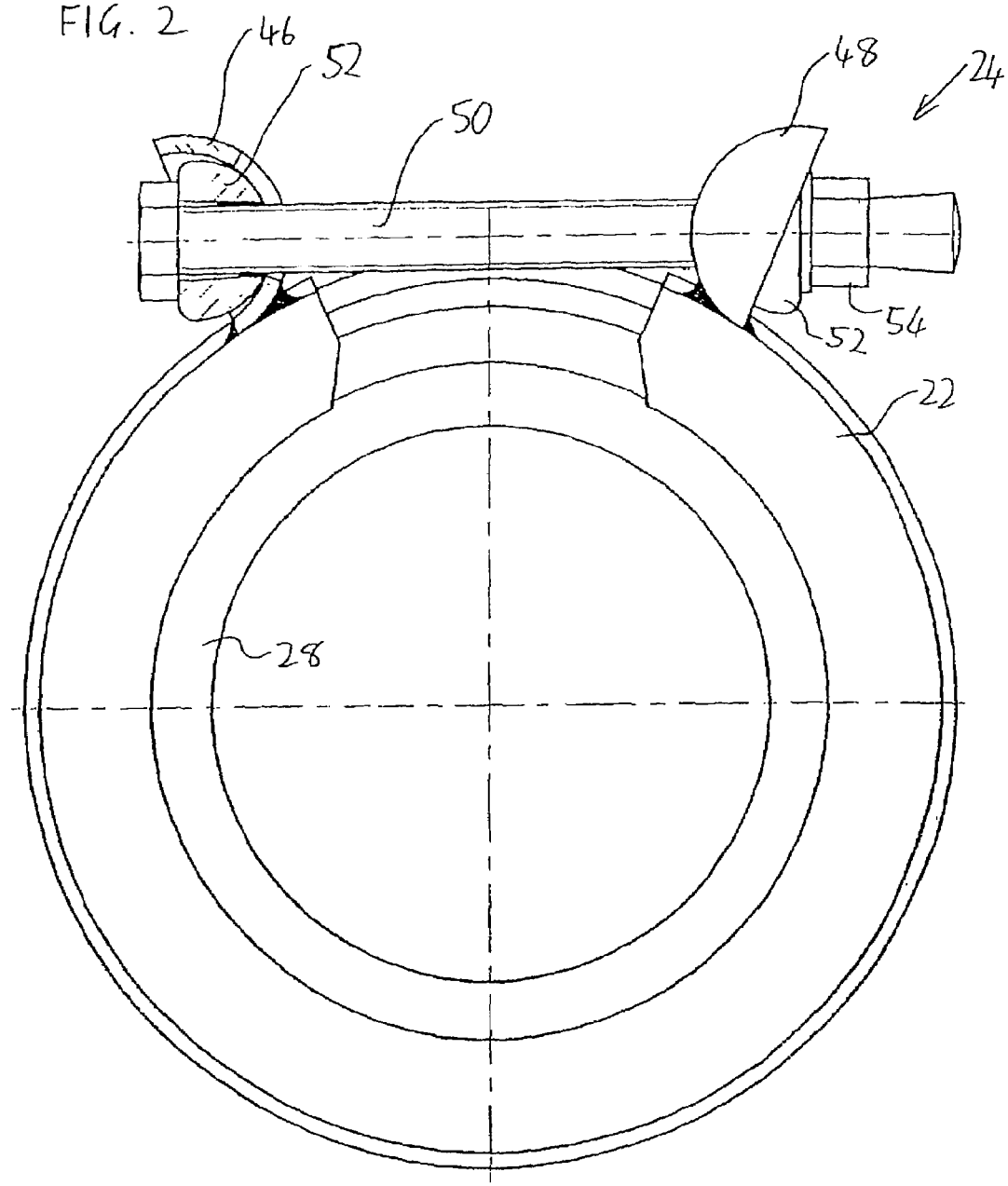
FIG. 2 is a transverse cross-section through the connector of FIG. 1.

Referring now to the drawings, FIGS. 1 and 2 show a first embodiment of a universal pipe connector, generally designated 10, constructed and operative according to the teachings of the present invention, for forming a connection with at least one, and in this case two, pipe ends 12 and 14.

Generally speaking, pipe connector 10 includes a connector body 16 having an opening 18, 20 for receiving each pipe end. A clamping ring 22 extends around, and mechanical engages with, each opening. Each clamping ring features a tightening mechanism 24 for tightening the clamping ring between maximum and minimum diameters which differ by at least a length d. Deployed around an inner surface of clamping ring 22 is an annular sealing element 26. Each sealing element 26 is formed with at least one substantially cylindrical coaxial layer 28 of thickness ½ d. Layers 28 are interconnected by readily severable connections such that, by removing an appropriate number of layers 28 and tightening the tightening mechanism 24, pipe connector 10 forms a sealing connection with pipes having diameters varying over a continuous range of at least 2 d.

It will be readily apparent that sealing element 26 renders universal pipe connector 10 highly versatile, with a single fixture adjusting quickly and effectively to a wide range of pipe diameters. Furthermore, by appropriate adjustment of the seals at more than one opening, connector 10 may be configured to serve as an adapter between pipes of different sizes. This, versatility, combined with the ability to accommodate considerable angular mobility of the connected pipes, provides a highly valuable universal fixture.

Parenthetically, it should be noted that, while the present invention is illustrated herein in the context of a straight connection between two pipe ends, the principles of the present invention are equally applicable to any fixture with which one or more pipe end is intended to seal. Examples include, but are not limited to, straight, angled and curved connections of two pipes, three or four way junctions, single-pipe connections integrally formed with a continuous primary pipe, and adapter versions of any of the above where one pipe is of different gauge from another pipe. Furthermore, in certain applications, it may be desirable to combine the seal structure of the present invention with one or more alternative seal structure for different branches of a single connector. It should be clearly understood that these and other variations fall within the scope of the present invention.

Turning now to the features of connector 10 in more detail, sealing element 26 preferably includes a primary outer sealing ring 30 with a substantially cylindrical inner surface 32. Preferably, the outer face 33 of outer sealing ring 30 is convexly curved, and typically approximately round, as viewed in axial cross-section. This, together with a complementary shaped inner surface of clamping ring 22, facilitates swiveling of sealing element 26 to accommodate variations in pipe alignment as illustrated in the right hand side of FIG. 1. At the same time, the substantially cylindrical inner surface of sealing ring 30 itself, or of layers 28, provide a much higher degree of sealing against the pipe surface than could be achieved with the circular cross-section O-rings of the prior art.

Layers 28 are formed as substantially cylindrical linings arranged coaxially and in nested form within inner surface 32. Sealing element 10 may be formed initially with any number of layers 28, from only one up to as many as ten or more. Typically, at least 2, and usually more than 3, layers 28 are provided. Each layer 28 is configured to provide a substantially cylindrical secondary inner surface 34 having an inner diameter less than that of inner surface 32.

Sealing element 26 is structurally unified by connections, typically in the form of connective strips 36 located between outer sealing ring 30 and the adjacent layer 28, and between each subsequent pair of adjacent layers. Typically, although not necessarily, connective strips 36 are formed as an annular connection extending around the entirety of sealing element 26 between each layer. Connective strips 36 are configured to provide structural unity while at the same time being readily severable. This is achieved by design appropriate to the material used. Typically, in the case of natural or synthetic rubber, appropriate properties are provided by limiting the thickness of the connective strips to not more than a few millimeters.

The entirety of sealing element 26 is typically made from elastic materials of the types conventionally used for sealing elements in each given type of application. Examples include, but are not limited to, the materials commonly known as Ethylene Propylene Diene Monomer (EPDM), Nitrile Butadiene Rubber (NBR), and Styrene Butadiene Rubber (SBR) which are rubbers and rubber substitutes.

It should be noted that the phrase "substantially cylindrical" as used herein describes the predominant geometry of the surfaces or elements in question, and does not exclude the presence of various localized surface features. In fact, in a preferred implementation, substantially cylindrical primary inner surface 32 and the adjacent face of layer 28 have complementary interlocking features configured to oppose movement of layer 28 relative to outer sealing ring 30 in at least one axial direction. In the example shown here, surface 32 features a barbed projection 38 which engages a corresponding stepped recess 40 in layer 28. Each successive layer 28 preferably also features a similar interlocking arrangement with the next layer out. These interlocking features oppose the effects of pressure within connector 10 which might otherwise compromise the unity of the seal structure.

Finally with respect to sealing element 26, outer sealing ring 30 preferably features an inner annular hollow 42 associated with a slit 44 which enables the sealing element to open slightly to lie closely against the pipe surface in all situations. A number of small apertures 45 formed laterally in sealing element 26 make a fluid connection between annular hollow 42 and the internal volume of connector 10 lying outside the sealing element. These apertures ensure that whatever pressure is present within the connector is supplied also to annular hollow 42, thereby forcing the parts of sealing element 26 outwards to provide hydraulic enhancement of the seal between sealing element 26 and the surface of the pipe. This feature is particularly significant because of the degree of flexibility facilitated by the other features of the present invention. Specifically, the hydraulic seal enhancement serves to maintain a highly effective seal during angular movement of the pipe ends under which purely mechanical sealing configurations would generally cease to be effective. It should be noted in this context that the term "hydraulic" is used to refer to the influence of whatever fluid is conveyed within the pipes which need not be water.

Turning now to the features of clamping ring 22, this is preferably formed as a split ring with outward-turned bolt flanges 46 and 48. It is a particular feature of certain preferred embodiments of the present invention that flanges 46 and 48 have an outwardly curved, and typically substantially arcuate, form. This form ensures that the closest points of the flanges are always parallel, independent of the stage of tightening of ring 22. Tightening mechanism 24 includes a bolt 50 connected between flanges 46 and 48. Preferably at least the head of bolt 50 is seated against a curved-base profile piece 52 formed to complement the curve of flange 46. In the example shown here, a nut 54 is seated against a second curved-base profile piece 52 on flange 48. The latter combination could clearly be replaced by a purpose-made curved base nut if desired.

Connector body 16 may have any conventional form as suited to the particular application required. Additionally, in order to benefit from the freedom of angular flexing allowed by the seal structure of the present invention, connector body 16 should be chosen to provide clearance for the anticipated range of flexural movement of the pipe ends. For smaller diameter pipes, considerable clearance may be provided by the inherent spacing caused by sealing element 26 even within a parallel sided connector body. For increased clearance, and especially for diameters near the maximum dimension of the connector, a broad-bellied connector body is preferred. This may be either the curved form illustrated, or may take any other form desired.

It will now be apparent that the present invention provides a highly efficient technique for achieving a sealed connection with an end of a pipe of given diameter. First, an appropriate size of pipe connector 10 is selected for which the innermost layer 28 of sealing element 26 has an inner diameter less than the given diameter of pipe. An appropriate number of layers 28 are then severed from sealing element 26 such that the internal diameter of the remaining portion of sealing element 26 slightly exceeds the diameter of the pipe. The end of the pipe is then inserted into connector 10 and the connector is tightened, thereby forming a sealed connection.

Figure 3:
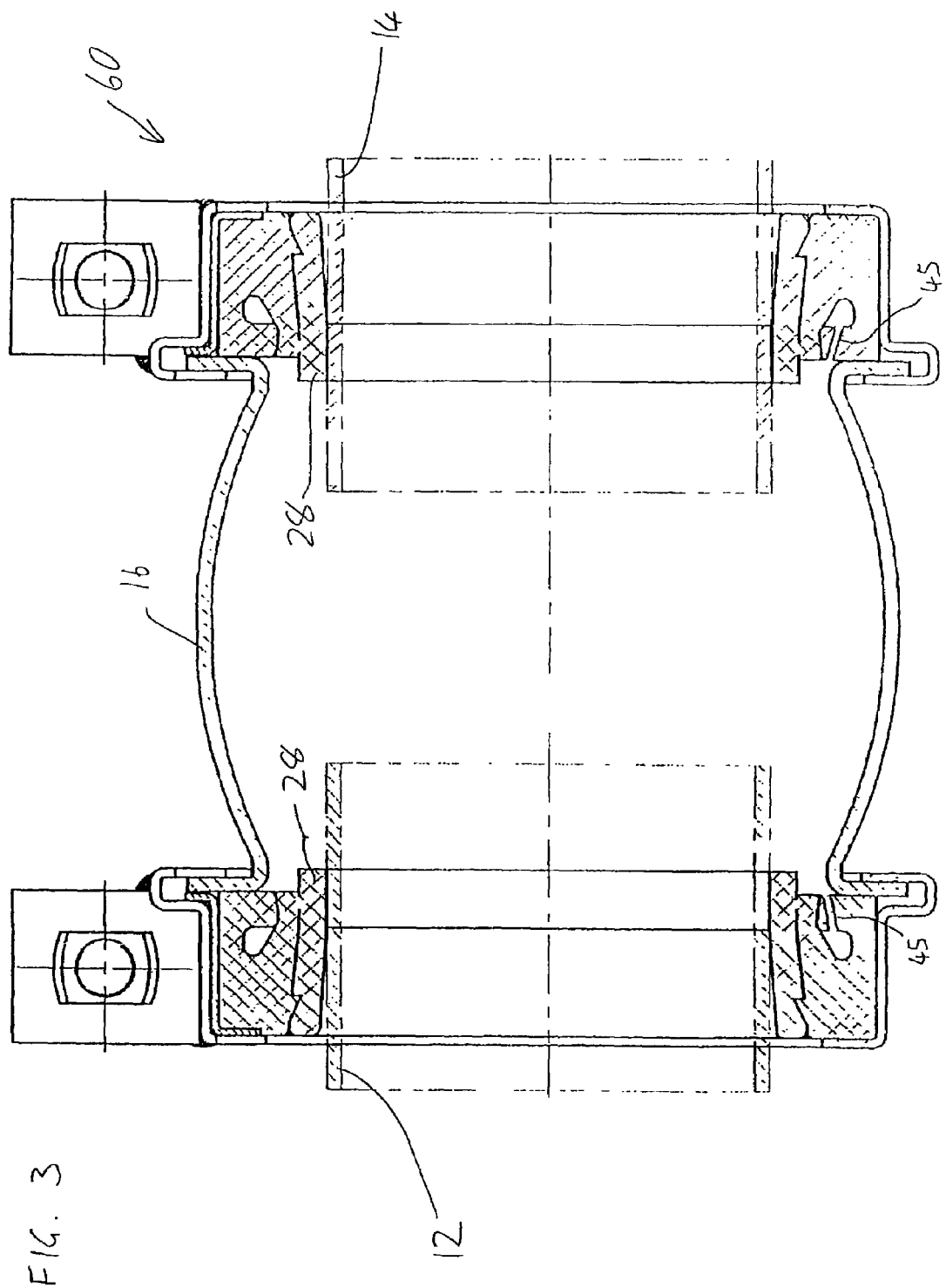
FIG. 3 is an axial cross-section through a second embodiment of a connector, constructed and operative according to the teachings of the present invention, employed to connect the ends of two pipes.

Turning now briefly to FIGS. 3 and 4, these show a second preferred embodiment of a universal pipe connector, generally designated 60, constructed and operative according to the teachings of the present invention. Connector 60 is generally similar to connector 10 described above, equivalent elements being labeled similarly. Connector 60 differs from connector 10 primarily in that it employs a sealing element with a flat outer surface. The profile of the clamping ring is correspondingly modified. This embodiment is particularly suited to applications in which a lesser degree of angular flexibility is required.

Finally, it should be noted that the principles of the present invention are not limited to use with circular cross-section pipes. Other possible applications include, but are not limited to, conduits having square, rectangular and semicircular cross-sections. In each case, the opening of the connector body, the clamping element, and the sealing element are correspondingly shaped to receive and form a sealing connection with the particular conduit used. All other features of such applications will be clear to one ordinarily skilled in the art by analogy to the embodiments described above.

It will be appreciated that the above descriptions are intended only to serve as examples, and that many other embodiments are possible within the spirit and the scope of the present invention.

The invention claimed is:

1. A universal pipe connector for forming an angularly flexible connection with at least one pipe end, the universal pipe connector comprising:

a connector body having an opening for receiving the pipe end, a clamping ring extending around, and in mechanical engagement with, said opening; and a sealing element deployed around and in contact with an inner surface of said clamping ring said inner surface having at least partially curved cross-section, said sealing element having an annular sealing surface coaxial with the pipe for sealing around an outer coaxial surface of the pipe end, wherein said sealing element is formed with a primary inner surface and at least one substantially cylindrical coaxial layer, said layer being connected to said primary inner surface by a readily severable connection wherein said sealing element comprises a plurality of substantially cylindrical coaxial layers having complementary interlocking features configured to oppose relative movement of said layers in at least one axial direction and wherein said sealing, element is adapted to swivel within said inner surface to accommodate variations in pipe alignment, wherein the inner girth of said connector body gradually increases away from the opening and wherein said opening is adapted to receive said clamping ring extending around said opening, wherein said clamping ring comprises a tightening mechanism for tightening said clamping ring between a first maximum diameter and a second minimum diameter, wherein said first and second diameters differ by at least a length d and wherein said cylindrical coaxial layer is of thickness ½ d such that, by selectively removing said layer and tightening said tightening mechanism, the pipe connector forms a sealing connection with pipes having diameters varying over a continuous range of at least 2d, wherein said clamping ring is formed as a split ring with outward-turned bolt flanges of substantially arcuate form, said tightening mechanism including a bolt connected between said bolt flanges.

2. The pipe connector of claim 1, wherein said tightening mechanism further includes at least one curved-base profile piece engaged against one of said bolt flanges.

* * * * *